US012469230B2

(12) United States Patent
Coup et al.

(10) Patent No.: US 12,469,230 B2
(45) Date of Patent: *Nov. 11, 2025

(54) SYSTEMS AND METHODS FOR GENERATING STEREOSCOPIC, AUGMENTED, AND VIRTUAL REALITY IMAGES

(71) Applicant: Universal City Studios LLC, Universal City, CA (US)

(72) Inventors: Thierry Coup, Orlando, FL (US); Brian McQuillian, Orlando, FL (US); Justin Schwartz, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/306,902

(22) Filed: Apr. 25, 2023

(65) Prior Publication Data
US 2023/0260230 A1    Aug. 17, 2023

Related U.S. Application Data

(63) Continuation of application No. 16/984,845, filed on Aug. 4, 2020, now Pat. No. 11,670,054, which is a
(Continued)

(51) Int. Cl.
*G06T 19/00* (2011.01)
*A63G 7/00* (2006.01)
(Continued)

(52) U.S. Cl.
CPC .............. *G06T 19/006* (2013.01); *A63G 7/00* (2013.01); *A63G 31/00* (2013.01); *A63G 31/16* (2013.01);
(Continued)

(58) Field of Classification Search
CPC ........ G06T 19/006; A63G 7/00; A63G 31/00; A63G 31/16; A63G 21/00; G02B 27/0172;
(Continued)

(56) References Cited

U.S. PATENT DOCUMENTS

| 6,462,769 B1 | 10/2002 | Trowbridge et al. |
| 9,766,462 B1 | 9/2017 | Worley et al. |

(Continued)

FOREIGN PATENT DOCUMENTS

| CN | 202036738 U | 11/2011 |
| CN | 103657118 A | 3/2014 |

(Continued)

OTHER PUBLICATIONS

AE Office Action for United Arab Emirates Application No. P6001524/2018 mailed Dec. 19, 2022.
(Continued)

Primary Examiner — Nasim N Nirjhar
(74) Attorney, Agent, or Firm — Fletcher Yoder, PC

(57) ABSTRACT

A ride system includes eyewear configured to be worn by a user. The eyewear includes a display having a stereoscopic feature configured to permit viewing of externally projected stereoscopically displayed images. The ride system includes a computer graphics generation system communicatively coupled to the eyewear, and configured to generate streaming media of a real world environment based on image data captured via the camera of the eyewear, generate one or more virtual augmentations superimposed on the streaming media of the real world environment, and to transmit the streaming media of the real world environment along with the one or more superimposed virtual augmentations to be displayed on the display of the eyewear, and project stereoscopic images into the real world environment.

20 Claims, 5 Drawing Sheets

Related U.S. Application Data continuation of application No. 15/586,956, filed on May 4, 2017, now abandoned.

(60) Provisional application No. 62/332,299, filed on May 5, 2016.

(51) Int. Cl.
| | |
|---|---|
| *A63G 31/00* | (2006.01) |
| *A63G 31/16* | (2006.01) |
| *G02B 27/01* | (2006.01) |
| *G02B 30/25* | (2020.01) |
| *G06F 3/01* | (2006.01) |
| *H04N 13/239* | (2018.01) |
| *H04N 13/324* | (2018.01) |
| *H04N 13/337* | (2018.01) |
| *H04N 13/344* | (2018.01) |
| *H04N 13/363* | (2018.01) |
| *H04N 13/366* | (2018.01) |
| *H04N 13/383* | (2018.01) |

(52) U.S. Cl.
CPC ..... *G02B 27/0172* (2013.01); *G02B 27/0179* (2013.01); *G02B 30/25* (2020.01); *G06F 3/011* (2013.01); *H04N 13/239* (2018.05); *H04N 13/324* (2018.05); *H04N 13/337* (2018.05); *H04N 13/344* (2018.05); *H04N 13/363* (2018.05); *H04N 13/366* (2018.05); *H04N 13/383* (2018.05); *G02B 2027/0134* (2013.01); *G02B 2027/0138* (2013.01); *G02B 2027/014* (2013.01); *G02B 2027/0178* (2013.01); *G02B 2027/0181* (2013.01); *G02B 2027/0183* (2013.01); *G02B 2027/0187* (2013.01); *H04N 2213/008* (2013.01)

(58) Field of Classification Search
CPC ................ G02B 27/0179; G02B 30/25; G02B 2027/0134; G02B 2027/0138; G02B 2027/014; G02B 2027/0178; G02B 2027/0181; G02B 2027/0183; G02B 2027/0187; G06F 3/011; H04N 13/239; H04N 13/324; H04N 13/337; H04N 13/344; H04N 13/363; H04N 13/366; H04N 13/383; H04N 2213/008
See application file for complete search history.

(56) References Cited

U.S. PATENT DOCUMENTS

| | | | |
|---|---|---|---|
| 2010/0079585 | A1 | 4/2010 | Nemeth et al. |
| 2011/0141246 | A1 | 6/2011 | Schwartz et al. |
| 2013/0002559 | A1 | 1/2013 | Vardi |
| 2013/0083008 | A1 | 4/2013 | Geisner et al. |
| 2013/0083014 | A1 | 4/2013 | Park et al. |
| 2013/0169924 | A1 | 7/2013 | Lampley, Jr. et al. |
| 2013/0278631 | A1 | 10/2013 | Border et al. |
| 2014/0282911 | A1* | 9/2014 | Bare ............... H04L 67/131 726/4 |
| 2015/0301592 | A1 | 10/2015 | Miller |
| 2015/0358539 | A1 | 12/2015 | Catt |
| 2016/0011422 | A1 | 1/2016 | Thurber et al. |
| 2016/0048203 | A1 | 2/2016 | Blum et al. |
| 2016/0167672 | A1 | 6/2016 | Krueger |
| 2016/0191887 | A1* | 6/2016 | Casas ............... H04N 13/156 348/47 |
| 2016/0231570 | A1 | 8/2016 | Levola et al. |
| 2016/0373731 | A1 | 12/2016 | Smoot et al. |
| 2017/0007351 | A1* | 1/2017 | Yu ................. G02B 27/0172 |
| 2017/0171534 | A1 | 6/2017 | Kondiparthi et al. |
| 2017/0272732 | A1* | 9/2017 | Bailey .............. H04N 13/334 |
| 2017/0295357 | A1 | 10/2017 | Yang |
| 2018/0033199 | A9* | 2/2018 | Eatedali ............. H04L 67/12 |
| 2018/0288393 | A1 | 10/2018 | Yerli |
| 2019/0109938 | A1 | 4/2019 | Jeong et al. |
| 2019/0121132 | A1 | 4/2019 | Shamir et al. |

FOREIGN PATENT DOCUMENTS

| | | |
|---|---|---|
| CN | 203894474 U | 10/2014 |
| CN | 204952289 U | 1/2016 |
| CN | 105492957 A | 4/2016 |
| JP | 2012212991 A | 11/2012 |
| KR | 20120094130 A | 8/2012 |
| KR | 20160048801 A | 5/2016 |
| RU | 51241 | 1/2006 |
| WO | 2012033095 A1 | 3/2012 |
| WO | 2014056000 A1 | 4/2014 |
| WO | 2016025962 A1 | 2/2016 |

OTHER PUBLICATIONS

Chinese Office Action for Chinese Application No. 201780027854.0 mailed Dec. 9, 2019, 23 pgs.
JP 2018-558202 Office Action mailed Nov. 19, 2020.
KR 2018-7034763 Office Action mailed Feb. 10, 2022.
PCT/US2017/031371 International Search Report and Written Opinion dated Jul. 21, 2017.
RU 2018142013 Office Action Jun. 8, 2020.

* cited by examiner

SYSTEMS AND METHODS FOR GENERATING STEREOSCOPIC, AUGMENTED, AND VIRTUAL REALITY IMAGES

CROSS-REFERENCE TO RELATED APPLICATIONS

The present application claims the benefit of U.S. Provisional Application No. 62/332,299, entitled "SYSTEMS AND METHODS FOR GENERATING STEREOSCOPIC, AUGMENTED, AND VIRTUAL REALITY IMAGES" and filed May 5, 2016, and is a continuation of U.S. patent application Ser. No. 15/586,956, entitled "SYSTEMS AND METHODS FOR GENERATING STEREOSCOPIC, AUGMENTED, AND VIRTUAL REALITY IMAGES" and filed May 4, 2017, and is a continuation of U.S. patent application Ser. No. 16/984,845, entitled "SYSTEMS AND METHODS FOR GENERATING STEREOSCOPIC, AUGMENTED, AND VIRTUAL REALITY IMAGES" and filed Aug. 4, 2020, the disclosures of which are incorporated herein by reference for all purposes.

BACKGROUND

The subject matter disclosed herein relates to amusement park attractions, and more specifically, to providing enhanced thrill factors and components of interest in amusement park attractions.

Amusement parks and/or theme parks may include various entertainment attractions, restaurants, and rides useful in providing enjoyment to patrons (e.g., families and/or people of all ages) of the amusement park. For example, the attractions may include traditional rides for kids such as carousels, as well as traditional rides for thrill seekers such as rollercoasters. It is now recognized that adding components of interest and thrill factors to such attractions can be difficult and limiting. Traditionally, for example, outside of providing an increasingly complex system of steep, twisting, and winding rollercoaster tracks, the thrill factor of such rollercoasters and/or other similar thrill rides may be limited to the existing course or physical nature of the thrill ride itself. It is now recognized that it is desirable to include components of interest and thrill factors in such attractions in a flexible and efficient manner relative to traditional techniques.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a ride system includes eyewear configured to be worn by the user, wherein the eyewear comprises a display having a stereoscopic feature configured to permit viewing of externally generated stereoscopically displayed images. The ride system includes a computer graphics generation system communicatively coupled to the eyewear, and configured to generate streaming media of a real world environment based on image data captured via the camera of the eyewear, generate one or more virtual augmentations superimposed on the streaming media of the real world environment, transmit the streaming media of the real world environment along with the one or more superimposed virtual augmentations to be displayed on the display of the eyewear, and project stereoscopic images into the real world environment.

In a second embodiment, a wearable electronic device includes a frame comprising a frame front; a left eye display lens and a right eye display lens coupled to the frame front; a first filter on the left eye display lens; a second filter on the right eye display lens, wherein the first filter is different than the second filter; and processing circuitry configured to: receive a signal from the computer graphics generation system, wherein the signal comprises a video stream of a virtualization of a real world environment along with at least one augmented reality (AR) image or at least one virtual reality (VR) image included in the video stream; and cause the left eye display and the right eye display to display the video stream.

In a third embodiment, a method includes receiving or accessing environmental image data via a computer graphics generation system, generating a virtualization of a real world environment of the amusement park based on the environmental image data; overlaying an augmented reality (AR) image or a virtual reality (VR) image onto the virtualization of the real world environment; transmitting the overlaid AR image or the VR image along with the virtualization of the real world environment to the eyewear during the cycle of the amusement park ride; transmitting a signal to the eyewear to permit viewing through displays of the eyewear; projecting stereoscopic images onto a surface of the real-world environment after transmitting the signal; and causing the stereoscopic images to be reflected through filters in the eyewear into a left and right eye of a user to generate an illusion of a 3D image.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
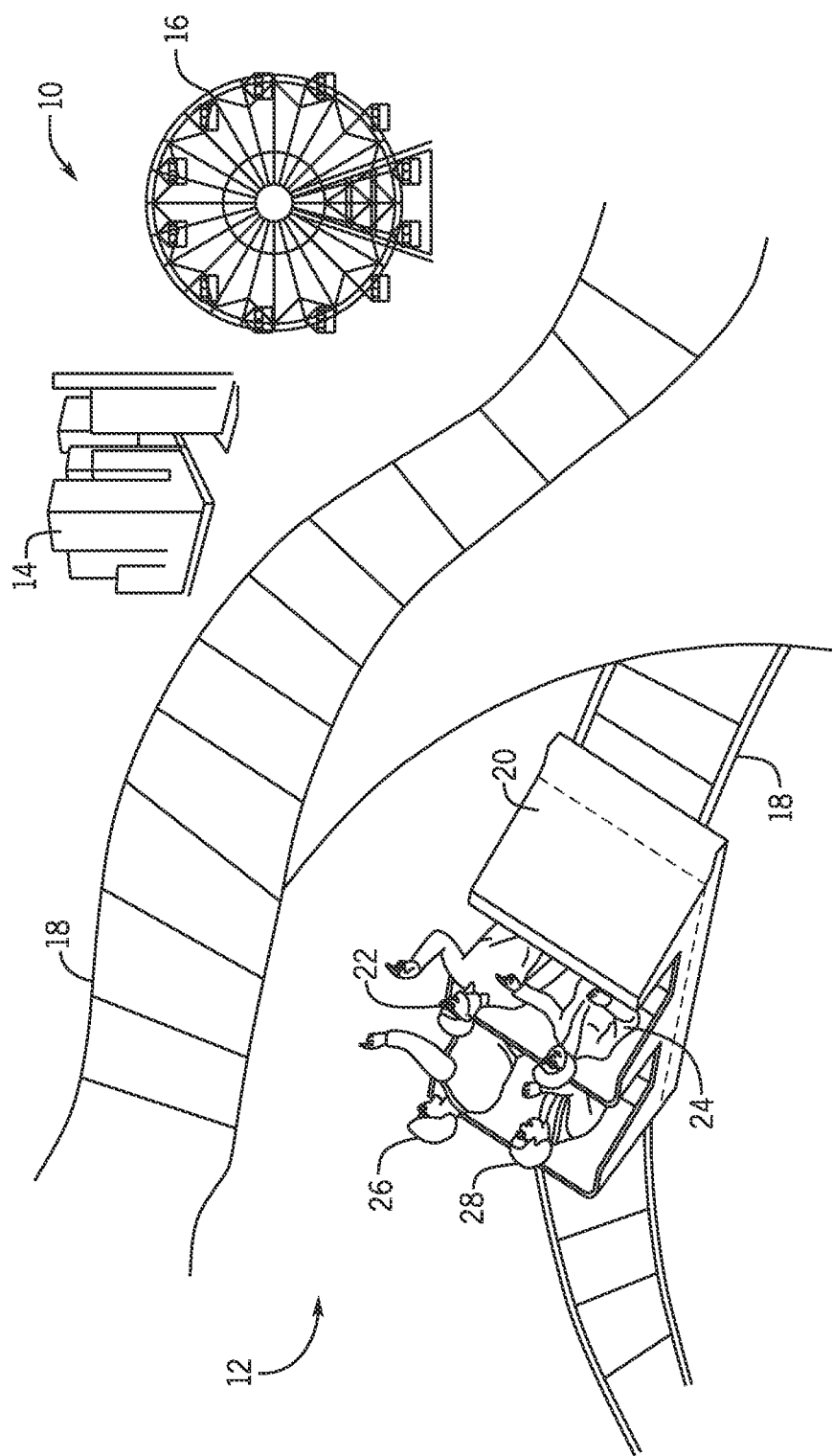
FIG. 1 illustrates an embodiment of an amusement park including one or more attractions in accordance with the present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems and methods of providing a stereoscopic mixed or augmented reality (AR) experience, a virtual reality (VR) experience, or a combination thereof, as part of an attraction, such as a thrill ride, in an amusement park or theme park. In certain embodiments, each ride passenger (e.g., first passenger, second passenger, etc.) may be provided eyewear, such as a pair of electronic goggles or eyeglasses to be worn during a cycle of the thrill ride. The eyewear may facilitate an AR experience, a VR experience, or a combination of both experiences. Thus, the eyewear may be referred to as stereoscopic eyewear or stereoscopic AR/VR eyewear. The stereoscopic AR/VR eyewear provides the capability of viewing stereoscopic images, which generate the illusion of 3D images. In addition, the stereoscopic AR/VR eyewear is configured for displaying augmented or virtual reality images overlaid on an image of the user's real-world environment, which generates the illusion that the overlaid image is part of the real world environment. Accordingly, the stereoscopic AR/VR eyewear is implemented with display lenses that are capable of displaying the overlaid AR/VR images transmitted from a central controller as well as being capable of permitting the user to view the real-world environment, including any stereoscopically displayed images. For example, the display lenses may be implemented with a polarizing layer, active shutters, color shifting capability, or other technology that permits stereoscopic viewing and that is compatible with the AR/VR capability of the eyewear. In this manner, a single eyewear device may be used within an environment to render a variety of different types of visual experiences. At the base level, the eyewear may also permit unaided, non-stereoscopic, or unaugmented viewing in certain instances, e.g., at the start of a theme park ride to permit the users to acclimatize themselves to the environment.

The stereoscopic AR/VR eyewear is capable of acting as a display for images that are created to reflect the real-world environment with augmented images. In such embodiments, the users view a displayed image that is displayed on the lenses of the eyewear in a manner that create the illusion that the augmented image is the real-world environment viewed in real time. The images of the real-world environment may be recorded ahead of time, e.g., may be stored in a memory of the system, or, in certain embodiments, may be collected in real-time by a user. Specifically, in one embodiment, the eyewear includes at least two cameras, which may respectively correspond to the respective points of view (e.g., right and left eye views) of the ride passengers, and may be used to capture real-time video data (e.g., video captured during live use and transmitted in substantially real-time) of the real-world environment (e.g., aspects of the physical amusement park) of the ride passengers and/or the thrill ride. The eyewear may also include a display. For example, the eyewear may include at least two displays respectively corresponding to each eye of a ride passenger using the eyewear.

In certain embodiments, a computer graphics generation system may also be provided. The computer graphics generation system may receive the real-time video data (e.g., live video that is transmitted in substantially real-time) from the eyewear, and may render a video stream of the real-world environment along with various AR, VR, or combined AR and VR (AR/VR) graphical images to the respective displays of the respective eyewear of the ride passengers during a cycle of the ride. For example, in one embodiment, the computer graphics generation system may render the AR/VR graphical images to the eyewear based on, for example, the position or location of a ride passenger vehicle along the tracks of a rollercoaster during a cycle of a thrill ride, a predetermined distance traveled by the passenger ride vehicle during a cycle of the thrill ride, or after a predetermined lapse of time in the cycle of the thrill ride. In this way, by using the eyewear and the graphics generation system to create an AR experience, a VR experience, or mixed reality experience, the eyewear and the computer graphics generation system may enhance the thrill factor of the thrill ride, and, by extension, may enhance the experience of the ride passengers as they ride the thrill ride. However, it should be appreciated that the techniques described herein may not be limited to thrill rides and/or amusement park attraction applications, but may also be extended to any of various applications such as, for example, medical applications (e.g., image-guided surgery, noninvasive imaging analysis), engineering design applications (e.g., engineering model development), manufacturing, construction, and maintenance applications (e.g., products manufacturing, new building construction, automobile repairs), academic and/or vocational training applications, exercise applications (e.g., bodybuilding and weight loss models), television (TV) applications (e.g., weather and news), and the like.

With the foregoing mind, it may be useful to describe an embodiment of an amusement park, such as an example amusement park 10 as depicted in FIG. 1. As illustrated, the amusement park 10 may include a thrill ride 12, a mall of amusement park facilities 14 (e.g., restaurants, souvenir shops, and so forth), and additional amusement attractions 16 (e.g., Ferris Wheel, dark ride, or other attraction). In certain embodiments, the thrill ride 12 may include a rollercoaster or other similar thrill ride, and may thus further include a closed-loop track or a system of closed-loop tracks 18 (e.g., miles of tracks 18). The tracks 18 may be provided as an infrastructure on which a passenger ride vehicle 20 may traverse, for example, as ride passengers 22, 24, 26, 28 ride the thrill ride 12. The tracks 18 may thus define the motion of the ride vehicle 20. However, in another embodiment, for example, the tracks 18 may be replaced by a controlled path, in which the movement of the ride vehicle 20 may be controlled via an electronic system, a magnetic system, or other similar system infrastructure other than the tracks 18. It should be appreciated that while the passenger ride vehicle 20 may be illustrated as a 4-passenger vehicle, in other embodiments, the passenger ride vehicle 20 may include any number of passenger spaces (e.g., 1, 2, 4, 8, 10, 20, or more spaces) to accommodate a single or multiple groups of ride passengers 22, 24, 26, 28. It should be understood that, while the thrill ride 12 is described in the context of the ride vehicle 20, other embodiments are contemplated (e.g., a seated theater environment, a walking or free movement arena environment, etc.) and may be used in conjunction with the disclosed embodiments.

As the passenger ride vehicle 20 traverses the tracks 18, the ride passengers 22, 24, 26, 28 may be provided a moving tour of the scenery (e.g., facilities 14, additional amuseattractions 16, and so forth) in an area around or nearby the thrill ride 12. For example, this may include the environment surrounding the thrill ride 12 (e.g., a building that fully or partially houses the thrill ride 12). While the ride passengers 22, 24, 26, 28 may find the thrill ride 12 to be a very enjoyable experience, in certain embodiments, it may be useful to enhance the experience of the ride passengers 22, 24, 26, 28 as the ride passengers 22, 24, 26, 28 ride the thrill ride 12 by enhancing, for example, the thrill factor of the thrill ride 12. Specifically, instead of having a physical view of only the facilities 14 (e.g., restaurants, souvenir shops, and so forth), additional amusement attractions 16 (e.g., Ferris Wheel or other attractions), or other patrons or pedestrians within the amusement park 10, it may be useful to provide the ride passengers 22, 24, 26, 28 with a augmented reality (AR) experience or a virtual reality (VR) experience as the ride vehicle 20 traverses the tracks 18.

Figure 2:
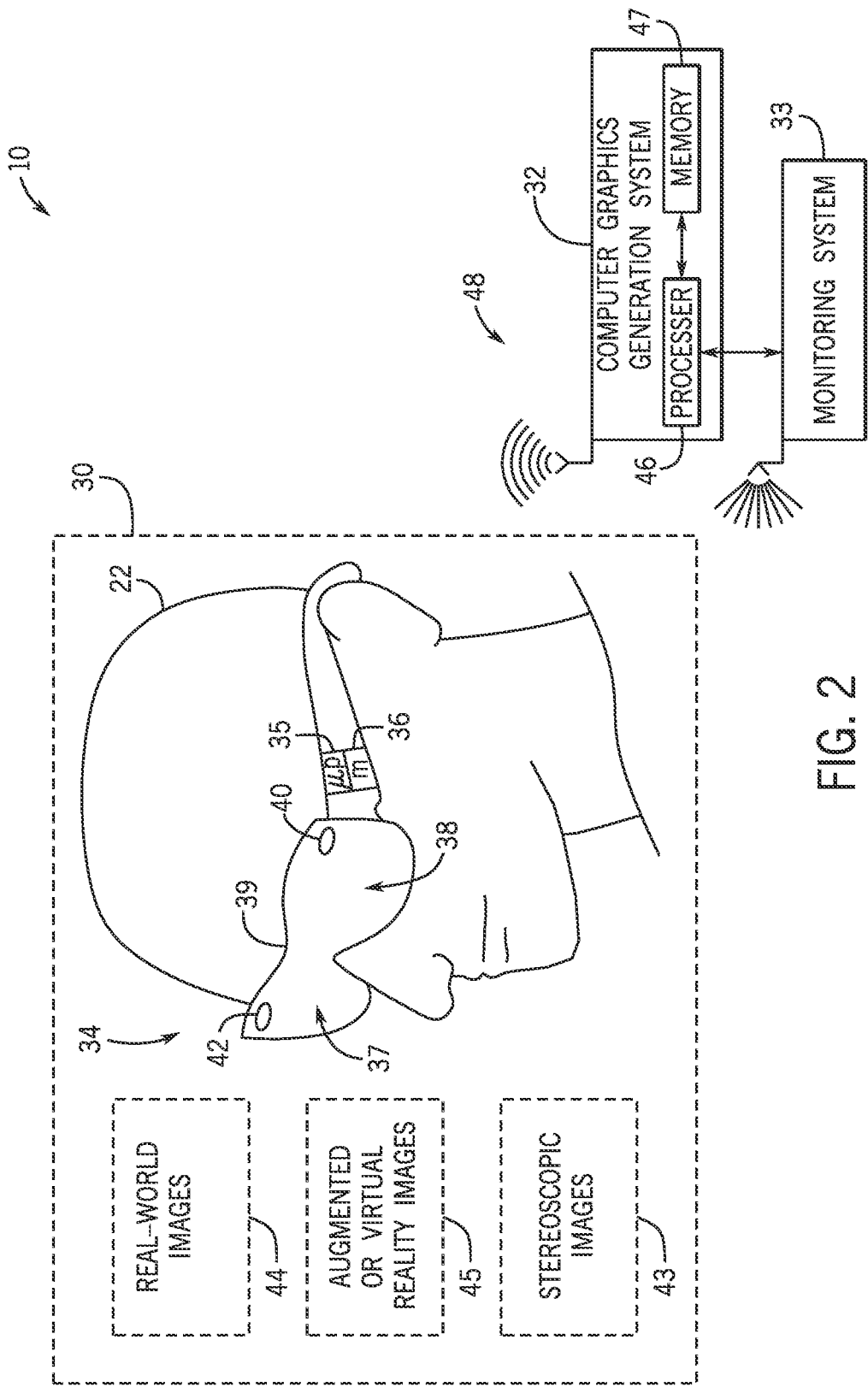
FIG. 2 is an illustration of an embodiment of stereoscopic augmented reality (AR) or virtual reality (VR) eyewear and a computer graphics generation system in accordance with present embodiments.

For example, turning now to FIG. 2, each of the ride passengers 22, 24, 26, 28 may be provided a pair of stereoscopic AR/VR eyewear 34, which may, in certain embodiments, include eyeglasses. In other embodiments, the stereoscopic AR/VR eyewear 34 may be included as part of a helmet, a visor, a headband, a pair of blinders, one or more eyepatches, and/or other headwear or eyewear that may be worn by each of the ride passengers 22, 24, 26, 28. As depicted, the stereoscopic AR/VR eyewear 34 may be communicatively coupled to a computer graphics generation system 32 (e.g., within the amusement park 10) via a wireless network 48 (e.g., wireless local area networks [WLAN], wireless wide area networks [WWAN], near field communication [NFC]). The stereoscopic AR/VR eyewear 34 may be used to create surreal environment 30, which may include an AR experience, a VR experience, a mixed reality experience, a combination of AR and VR experience, a computer-mediated reality experience, a combination thereof, or other similar surreal environment for the ride passengers 22, 24, 26, 28 as the ride passengers 22, 24, 26, 28 ride the thrill ride 12. Specifically, the stereoscopic AR/VR eyewear 34 may be worn by the ride passengers 22, 24, 26, 28 throughout the duration of the ride, such that ride passengers 22, 24, 26, 28 may feel completely encompassed by the environment 30 and may perceive the environment 30 to be a real-world physical environment. Specifically, as will be further appreciated, the environment 30 may be a real-time video including real-world images 44 that the ride passengers 22, 24, 26, 28 would see, even when not wearing the stereoscopic AR/VR eyewear 34 electronically merged with one or more AR or VR images 45 (e.g., virtual augmentations). The term "real-time" indicates that the images are obtained and/or provided in a timeframe substantially close to the time of actual observation. In alternative embodiments, the obtained images may be historical images of the environment.

In certain embodiments, the stereoscopic AR/VR eyewear 34 may be any of various wearable electronic devices that may be useful in creating an AR experience, a VR, and/or other computed-mediated experience to enhance the thrill factor of the thrill ride 12, and, by extension, the experience of the ride passengers 22, 24, 26, 28 while on the thrill ride 12. It should be appreciated that the eyeglasses embodiment of the stereoscopic AR/VR eyewear 34 as discussed herein may be distinct from, and may provide many advantages over traditional devices such as head-mounted displays (HMDs) and/or heads-up displays (HUDs). For example, as will be further appreciated, the stereoscopic AR/VR eyewear 34 may include a number of orientation and position sensors (e.g., accelerometers, magnetometers, gyroscopes, Global Positioning System [GPS] receivers) that may be used to track the position, orientation, and motion of the ride passengers 22, 24, 26, 28 during a cycle of the thrill ride 12.

Similarly, features of the stereoscopic AR/VR eyewear 34 (e.g., geometric aspects or markings) may be monitored by a monitoring system (e.g., one or more cameras) to determine position, location, orientation, and so forth of the stereoscopic AR/VR eyewear 34 and, in turn, that of the wearer. Still, the ride passengers 22, 24, 26, 28 may be monitored by a monitoring system 33 (e.g., a camera), which may be communicatively coupled to the computer graphics generation system 32 and used to identify position, location, orientation, and so forth of the ride passengers 22, 24, 26, 28. The ride vehicle 20 may also include one or more sensors (e.g., weight sensors, mass sensors, motion sensors, ultrasonic sensors) that may be useful in monitoring the respective ride passengers 22, 24, 26, 28 for the graphics generation system 32 to determine the point of view of the respective ride passengers 22, 24, 26, 28. Moreover, as will be further appreciated, because the stereoscopic AR/VR eyewear 34 may include individual cameras (e.g., cameras 40 and 42) and individual displays (e.g., displays 37 and 38), data with respect to the respective points of view of each eye of the ride passengers 22, 24, 26, 28 may be captured by stereoscopic AR/VR eyewear 34. All of these advantages may be unavailable using devices such as traditional HMDs and/or HUDs.

In certain embodiments, to support the creation of the environment 30, the stereoscopic AR/VR eyewear 34 may include processing circuitry, such as a processor 35 and a memory 36. The processor 35 may be operatively coupled to the memory 36 to execute instructions for carrying out the presently disclosed techniques of generating real-world images 44 merged with one or more AR/VR images 45 to enhance the thrill factor of the thrill ride 12, and, by extension, the experience of the ride passengers 22, 24, 26, 28 while on the thrill ride 12. These instructions may be encoded in programs or code stored in a tangible non-transitory computer-readable medium, such as the memory 36 and/or other storage. The processor 35 may be a general-purpose processor, system-on-chip (SoC) device, an application-specific integrated circuit (ASIC), or some other similar processor configuration. In alternative embodiments, the processor 35 and the memory 36 may be provided as an auxiliary pack carried by the user (e.g., clipped at the waited or carried in a pocket), either wired to or in wireless communication with the stereoscopic AR/VR eyewear 34. In other embodiments, the stereoscopic AR/VR eyewear 34 communicates wirelessly with the computer graphics generation system 32 and does not perform on-board image processing.

In certain embodiments, as further illustrated, the stereoscopic AR/VR eyewear 34 may also include the pair of displays 37 and 38 (e.g., which may be provided in the frame front 39 of the stereoscopic AR/VR eyewear 34 where eyeglass lenses would otherwise appear) respectively corresponding to each eye of the ride passengers 22, 24, 26, 28. In other embodiments, a unified display may be employed. The respective displays 37 and 38 may each include a display that covers at least part or only some of the viewing surface. The displays 37, 38 may be an opaque liquid crystal display (LCD), an opaque organic light emitting diode (OLED) display, or other similar display useful in displaying the real-world images 44 and the AR/VR graphical images 45 to the ride passengers 22, 24, 26, 28. In another embodiment, the respective displays 37 and 38 may each include a see-through LCD or a see-through OLED display useful in allowing, for example, the ride passengers 22, 24, 26, 28 to view the real-world images 44 and the AR/VR graphical images 45 appearing on the respective displays 37 and 38 while preserving the ability to see through the respective displays 37 and 38 to the actual and physical real world environment (e.g., the amusement park 10). In yet another embodiment, the displays 37 and 38 permit viewing of stereoscopic images 43. The displays 37, 38 may also include light field displays. In certain embodiments, the displays 37, 38 may toggle between opaque and transparent configurations, depending on the desired visual environment.

The cameras 40 and 42 may respectively correspond to the respective points of view of the ride passengers 22, 24, 26, 28, and may be used to capture real-time video data (e.g., live video) of the real-world environment. In some embodiments, a single camera may be employed. Specifically, in the illustrated embodiment, the cameras 40, 42 of the stereoscopic AR/VR eyewear 34 may be used to capture real-time images of the real-world physical environment (e.g., the physical amusement park 10) perceived by the respective ride passengers 22, 24, 26, 28 from the point of view of the respective ride passengers 22, 24, 26, 28. As will be further appreciated, the stereoscopic AR/VR eyewear 34 may then transmit (e.g. wirelessly via one or more communications interfaces included in the stereoscopic AR/VR eyewear 34) real-time video data captured via the respective cameras 40 and 42 to a computer graphics generation system 32 for processing. However, in other embodiments, the real-time video data captured via the respective cameras 40 and 42 may be processed on the stereoscopic AR/VR eyewear 34 via the processor 35. Additionally, the stereoscopic AR/VR eyewear 34 may also transmit orientation data, position data, point of view data (e.g., focal length, orientation, pose, and so forth), motion tracking data, and so forth obtained and/or derived based on data obtained via orientation and position sensors (e.g., accelerometers, magnetometers, gyroscopes, Global Positioning System [GPS] receivers, and so forth) motion tracking sensors (e.g., electromagnetic and solid-state motion tracking sensors), and so forth, that may be included in the stereoscopic AR/VR eyewear 34. Further, in embodiments in which the real-world image data of the environment (e.g., the ride 12) is previously acquired and accessed, the stereoscopic AR/VR eyewear may be implemented without the cameras 40 and 42.

In certain embodiments, as previously noted, the computer graphics generation system 32, which may also includes processing circuitry, such as a processor 46 (e.g., general purpose processor or other processor) and a memory 47, may process the real-time video data (e.g., live video) and orientation and position data and/or point of view data received from the stereoscopic AR/VR eyewear 34 or the monitoring system 33. Specifically, the computer graphics generation system 32 may use this data to generate a frame of reference to register the real-time video data with the generated real-world images 44 and the AR/VR graphical images 45. Specifically, using the frame of reference generated based on the orientation data, position data, point of view data, motion tracking data, and so forth, the graphics generation system 32 may then render a view of the real-world images 44 that is temporally and spatially commensurate with what the respective ride passengers 22, 24, 26, 28 would perceive if not wearing the stereoscopic AR/VR eyewear 34. The graphics generation system 32 may constantly update (e.g., in real-time) the rendering of the real-world images to reflect change in respective orientation, position, and/or motion of the respective the ride passengers 22, 24, 26, 28.

For example, in certain embodiments, the graphics generation system 32 may render images (e.g., real world images 44 and AR/VR images 45) at a real-time rate greater than or equal to approximately 20 frames per second (FPS), greater than or equal to approximately 30 FPS, greater than or equal to approximately 40 FPS, greater than or equal to approximately 50 FPS, greater than or equal to approximately 60 FPS, greater than or equal to approximately 90 FPS, or greater than or equal to approximately 120 FPS. Furthermore, the graphics generation system 32 may generate the real-world images 44 for each of the respective stereoscopic AR/VR eyewear 34 worn by the respective ride passengers 22, 24, 26, 28 (e.g., adjusted for the respective orientation, position, and point of view of the respective ride passengers 22, 24, 26, and 28).

In certain embodiments, as previously discussed, the computer graphics generation system 32 may also generate and render one or more AR/VR graphical images 45 superimposed on the real-world images 44 to create a complete AR experience, VR experience, mixed reality, and/or other computer-mediated experience for the ride passengers 22, 24, 26, 28. For example, in certain embodiments, the computer graphics generation system 32 may utilize one or more of the discussed video merging and/or optical merging techniques to superimpose the AR/VR graphical images 45 onto the real-world images 44, such that the ride passengers 22, 24, 26, 28 perceive the real-world physical environment of the amusement park 10 (e.g., provided as rendered video data via the respective displays 37 and 38) along with an AR/VR graphical image 45 (e.g., virtual augmentations) as the passenger ride vehicle 20 traverses the tracks 18. Specifically, as discussed above with respect to the rendering of the real-world images 44, the graphics generation system 32 may render a view of the AR/VR graphical images 45 that is temporally and spatially commensurate with the real-world images 44, such that the real-world images 44 may appear as a background overlaid with the AR/VR graphical images 45. Indeed, a model may provide computer generated images for any available viewpoint and specific images may be provided to the stereoscopic AR/VR eyewear 34 for display based on a detected orientation of the stereoscopic AR/VR eyewear 34.

In certain embodiments, the graphics generation system 32 may also generate one or more brightness, lighting, or shading models, and/or other photorealistic rendering models to generate the real-world images 44 and the AR/VR graphical images 45 adjusted to accurately reflect contrast and brightness of the real-world physical environment (e.g., sunny day, partly cloudy day, cloudy day, evening, night) in rendering the real-world images 44 and the AR/VR graphical images 45. For example, to increase the photorealism of the real-world images 44 and the AR/VR graphical images 45, the graphics generation system 32 may, in some embodiments, receive weather related data from one or more weather forecast and/or prediction systems (e.g., Global Forecast System, Doppler radars, and so forth). The graphics generation system 32 may then use the weather related data or other similar data to adjust the contrast, brightness, and/or other lighting effects of the real-world images 44 and/or the AR/VR graphical images 45.

In other embodiments, the graphics generation system 32 may adjust the contrast, brightness, and/or other lighting effects of the real-world images 44 and/or the AR/VR graphical images 45 based on lighting detected from one or more light sensors included in the stereoscopic AR/VR eyewear 34 or based on the real-time video data captured by the cameras 40, 42. Furthermore, as previously noted, the graphics generation system 32 may constantly update (e.g., in real-time) the rendering of the AR/VR graphical images 45 to reflect change in respective orientations, positions, points of view, and/or motion of the respective ride passengers 22, 24, 26, 28. For example, as will be further appreciated with respect to FIG. 3, the graphics generation system 32 may render the AR/VR graphical images 45 on the respective displays 37 and 38 of each of the respective stereoscopic AR/VR eyewear 34 worn by the respective the ride passengers 22, 24, 26, 28 adjusted for the variable respective positions, points of view, and motions of the respective the ride passengers 22, 24, 26, and 28.

As will be further appreciated, the graphics generation system 32 may also generate the AR/VR graphical images 45 at a time in which the passenger ride vehicle 20 crosses at a predetermined point along the tracks 18. Thus, in certain embodiments, the graphics generation system 32 may use the received position data, point of view data, motion data along with GPS data or geographical informational systems (GIS) data to derive an illumination map of, for example, the thrill ride 12 and tracks 18, as well as the immediate environment surrounding the thrill ride 12 for the entire cycle of the thrill ride 12. The graphics generation system 32 may then use the map to introduce the AR/VR graphical images 45 at certain predetermined points (e.g., points based on location, distance, or time) as the passenger ride vehicle 24 traverses the tracks 18. Furthermore, in certain embodiments, the video or image data captured via the cameras 40, 42 may be used by the graphics generation system 32 to determine the points of location of the ride vehicle 20 and when to introduce the AR/VR graphical images 45. For example, the graphics generation system 32 may perform one or more geometric recognition algorithms (e.g., shape or object recognition) or photometric recognition algorithms (e.g., face recognition or specific object recognition) to determine the position or location of the ride vehicle 20 as well as the viewing position of the ride passengers 22, 24, 26, 28.

Figure 3:
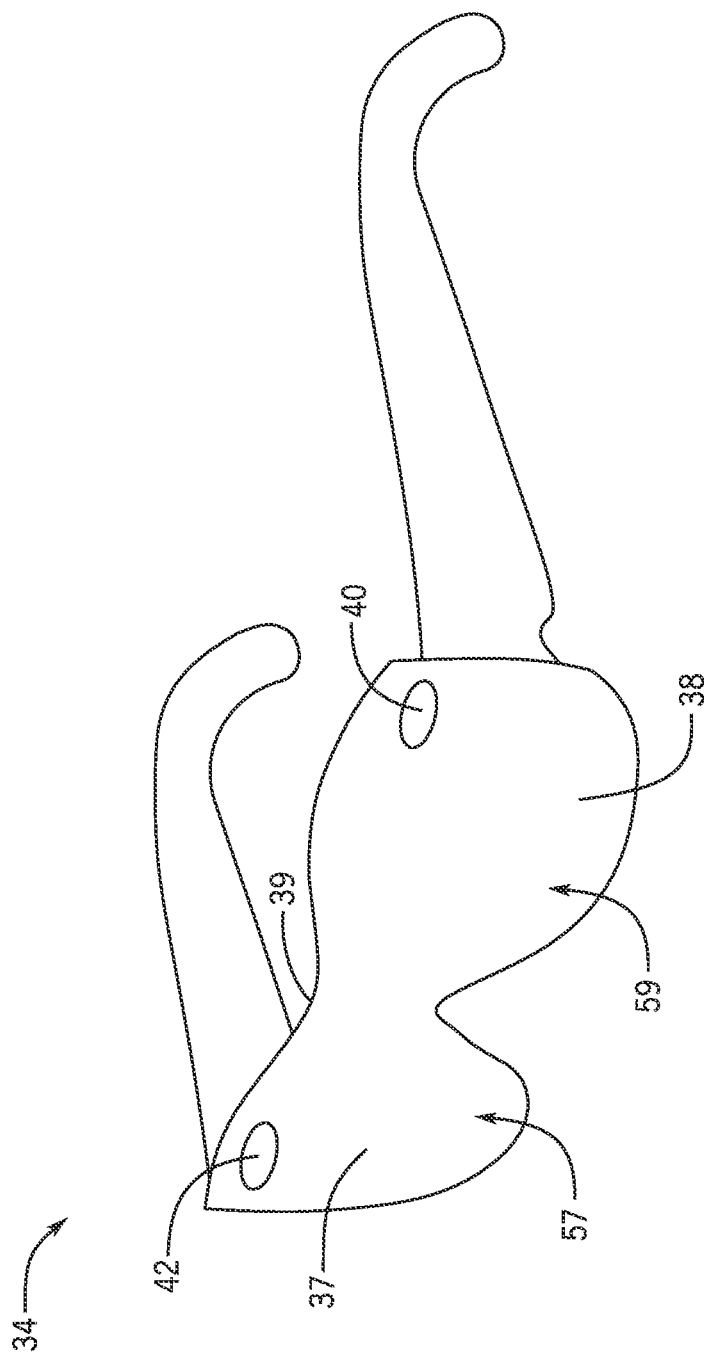
FIG. 3 is an illustration of an embodiment of stereoscopic augmented reality (AR) or virtual reality (VR) eyewear.

FIG. 3 is an illustration of the stereoscopic AR/VR eyewear 34 showing an embodiment in which the stereoscopic AR/VR eyewear 34 includes features that also permit viewing of externally projected stereoscopic images. For example, the displays 37 and 38 may include a polarization feature such as a polarized coating or layer to permit the user to resolve stereoscopically projected images as being in 3D. The polarization feature may be coated on an outer surface 57 of the display 37 and an outer surface of the display 38. Alternatively, the polarization feature may be formed within, embedded in, or formed on an opposing surface of the displays 37 and 38. The polarization feature on the right eye display 37 has different polarization characteristics than the polarization feature on the left eye display 38 to permit each respective display 37 and 38 to act as a filtered lens that only permits polarized light having the appropriate characteristics to pass through. In this manner, two images projected superimposed onto a screen may viewed stereoscopically. In certain embodiments, the polarization feature in the respective displays may be linear polarization filters orthogonally oriented relative to one another. In another embodiment, the polarization filters of the displays 37 and 38 may be circular polarization filters of opposite handedness relative to one another. In another embodiment, the stereoscopic AR/VR eyewear 34 has color-shifting filters, such that the respective displays 37 and 38 include color filters that filter different wavelengths relative to one another. In a specific embodiment, the stereoscopic AR/VR eyewear 34 may be implemented with Inficolor 3D technology or with Infitec® 3D technology (Infitec GmbH, Baden Wuerttemberg, Germany).

Other implementations are also contemplated. For example, the spectroscopic AR/VR eyewear 34 may have active stereoscopic capabilities, such as active shutters that cycle each display 37 and 38 on and off alternately. It is contemplated that changing the shutter rates may be used to provide individualized content between different users. For example, a first user and a second user, both with respective eyewear 34, may have different assembled content if their active shutters are controlled at different rates. The control may be based on signals received from the system 32, including signals embedded within the displayed frames. In other embodiments, the shutter control may be preset on the device. Active stereoscopic implementations may be advantageous in darker rides, because the lack of color or polarizing filters may permit more light to pass through the displays 37 and 38 when they are acting as lenses for stereoscopic viewing. It should also be understood that when the stereoscopic AR/VR eyewear 34 is being used in the AR/VR mode, the displays 37 and 38 may be used to generate an internal 3D or stereoscopic image. That is, in certain embodiments, the user views a transmitted image or a video stream that may be implemented stereoscopically. For example, the left eye display 38 may display a separate video channel than the right eye display 37. Based on the perspective differences or slight differences in the displayed images or video stream between the left eye/righteye view, similar to those generated on projected stereoscopic images, a 3D illusion may be internally generated in the displayed content.

Figure 4:
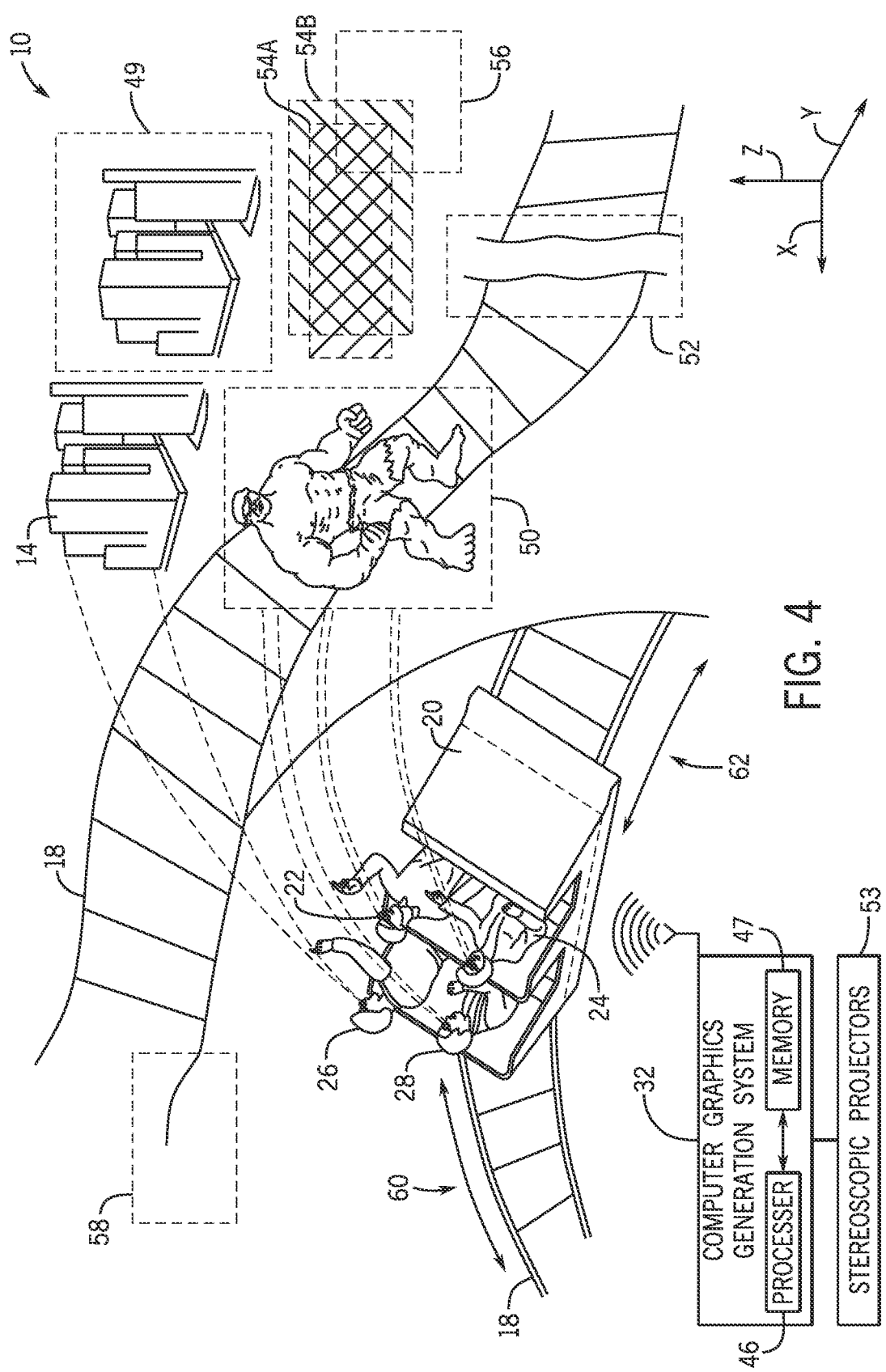
FIG. 4 is a perspective view of a thrill ride of FIG. 1 including various AR and VR images provided by way of the stereoscopic AR/VR eyewear of FIG. 2, in accordance with present embodiments.

FIG. 4 illustrates various examples of AR/VR images 45 that may be generated by the graphics generation system 32, or in other embodiments, that may be generated via the stereoscopic AR/VR eyewear 34. Specifically, as illustrated in FIG. 3, during a cycle of the thrill ride 12, the graphics generation system 32 may render stereoscopic images 43, the real-world images 44, as well as various AR/VR graphical images 45 through the respective stereoscopic AR/VR eyewear 34 (e.g., via the respective displays 37 and 38) of the rides passengers 22, 24, 26, 28. For rendering stereoscopic images, the graphics generation system 32 may be used in conjunction with stereoscopic projectors 53. The real-world images 44 may include rendered images of, for example, the tracks 18, the facilities 14, and/or other patrons or objects that the ride passengers 22, 24, 26, 28 would see while riding the thrill 12, including the other passengers 22, 24, 26, 28, even if the stereoscopic AR/VR eyewear 34 were not being worn by the ride passengers 22, 24, 26, 28. However, as previously discussed with respect to FIG. 2, in certain embodiments, it may be useful to enhance the thrill factor of the thrill ride 12 by rendering various AR/VR graphical images 45 to the respective displays 37 and 38 of the respective stereoscopic AR/VR eyewear 34 of the ride passengers 22, 24, 26, and 28.

For example, as further depicted in FIG. 3, the graphics generation system 32 may render AR/VR graphical images 45 (illustrated via the dashed lines) that may include, for example, an AR/VR image of a second mall of amusement park facilities 49, an AR/VR image of one or more fictional characters 50, an AR/VR image of a breach 52 of the tracks 18, and/or additional AR/VR image 54, 56, and 58. In one embodiment, as illustrated in FIG. 3, the AR/VR image 50 may include an image of a monster or other similar fictional character appearing (e.g., from the point of view of the ride passengers 22, 24, 26, 28 while wearing the stereoscopic AR/VR eyewear 34) to be obstructing a portion of the tracks 18 as the passenger ride vehicle 20 traverses the tracks 18. It should be appreciated that in addition to AR/VR graphical images 45 (e.g., virtual augmentations) that include an added image, the graphics generation system 32 may also render certain AR/VR graphical images 45 that include a deletion of one or more real-world physical objects that no longer appear while the ride passengers 22, 24, 26, 28 are wearing the stereoscopic AR/VR eyewear 34. For example, the AR/VR image of the facilities 49 may appear at a place in which the attraction 16 is placed in the real-world environment.

As previously discussed, in certain embodiments, the graphics generation system 32 may render the AR/VR graphical images 45 based on, for example, the position or location of the passenger ride vehicle 20 along the tracks 18 at any given time during a cycle of the thrill ride 12, a predetermined distance traveled by the passenger ride vehicle 20 during a cycle of the thrill ride 12, or after a predetermined lapse of time. For example, in one embodiment, once the passenger ride vehicle travels to a point 60 (e.g., defined by a certain distance 62 or location on the tracks 18), the AR/VR image of the fictional character 50 may appear to the ride passengers 22, 24, 26, 28, via the stereoscopic AR/VR eyewear 34, as obstructing a place on the tracks 18 not yet traversed by the passenger ride vehicle 20 during a given cycle of the thrill ride 12. Similarly, once the passenger ride vehicle 20 travels to a point 62 (e.g., defined by a certain distance 62 or location on the tracks 18), the AR/VR image of the breach 52 of the tracks 18 (e.g., appearance of a broken track) may appear to the ride passengers 22, 24, 26, 28, via the stereoscopic AR/VR eyewear 34, as though the passenger ride vehicle 20 will encounter a place in which there is no supporting tracks 18. The graphics generation system 32 may render the AR/VR graphical images 45 based on the identity of the individual users of the eyewear 34. Each eyewear 34 may be associated with an RFID tag or other identification element that transmits an identification signal to the graphics generation system 32. The system 32 may select the overlaid image from among several options stored in the memory 47 based on the identity of the ride passenger (e.g., ride passengers 22, 24, 26, 28). In this manner, each passenger in a ride vehicle 20 may receive customized content that is different from that received by the other passengers in the ride vehicle 20. For example, in a ride that includes character content, certain passengers wearing particular eyewear 34 may be associated with particular characters. In such embodiments, the overlaid AR/VR image may be associated with the particular character. The ride passengers may (e.g., ride passengers 22, 24, 26, 28) may have individualized interactive content displayed via the eyewear 34 that is based on previous park experiences, rewards, characters, passenger age or interests, passenger profile information acquired from a central server, etc. In one embodiment, a guest in an interactive arena may see a particular overlaid image displayed only if they successfully perform a physical action (e.g., punch a block or open a door).

Furthermore, in certain embodiments, the illumination map generated by the graphics generation system 32 may allow the graphics generation system 32 to include one or more detection and/or trigger points (e.g., trigger point for which to introduce the AR/VR images 45) at every mile of the tracks 18, every yard of the tracks 18, every foot of the tracks 18, every inch of the tracks 18, every centimeter of the tracks 18, or every millimeter of the tracks 18. In this way, the graphics generation system 32 may detect when to begin rendering of the AR/VR graphical images 45 based on position or location, distance traveled, and/or time elapsed during a cycle of the thrill ride 12 with sufficient accuracy and efficiency. Furthermore, certain images 54, 56 illustrate that one or more of the AR/VR graphical images 45 may appear to the ride passengers 22, 24, 26, 28 as interacting with each other (e.g., overlapping or touching). In one embodiment, the images (e.g., images 54A and 54B) may be stereoscopic images. Similarly, the AR/VR image 58 illustrates an example of AR/VR graphical images 45 that may appear outside the line of sight or the point of view (e.g., blind spot) of the ride passengers 22, 24, 26, 28 that may be nevertheless perceived by the ride passengers 22, 24, 26, 28 should any of them look into the direction of the AR/VR image 58. It should be noted that completely different images may also be provided to different ride passengers 22, 24, 26, 28 such that one or more of the ride passengers 22, 24, 26, 28 have partially or completely different ride experiences or even ride themes.

In certain embodiments, as discussed above with respect to FIG. 2, because the graphics generation system 32 may render the real-world images 44 and the AR/VR images 45 to each of the respective displays 37 and 38 of the stereoscopic AR/VR eyewear 34 worn by each of the respective the ride passengers 22, 24, 26, and 28, the ride passengers 22, 24, 26, 28 may each perceive the real-world images 44 (e.g., facilities 14, thrill ride 12, and so forth) and the AR/VR images 45 (e.g., AR/VR images or virtual augmentations 49, 50, 52, 54, 56, and 58) temporally and spatially commensurate with their respective points of view, thus creating a photorealistic effect as the passenger ride vehicle 20 traverses the tracks 18. Furthermore, in other embodiments, in addition to the AR/VR images 45 (e.g., AR/VR images or virtual augmentations 49, 50, 52, 54, 56, and 58), the graphics generation system 32 may also trigger one or more sound effects, haptic feedback effects, scented effects, and so forth that may coincide with the appearances of the AR/VR images 45 on the stereoscopic AR/VR eyewear 34. In some embodiments, the graphics generation system 32 is integral with the stereoscopic AR/VR eyewear 34.

In this way, by providing the stereoscopic AR/VR eyewear 34 and the graphics generation system 32 to create an AR experience, a VR experience, and/or other computed-mediated reality experience, the stereoscopic AR/VR eyewear 34 and the graphics generation system 32 may enhance the thrill factor of the thrill ride 12, and, by extension, the experience of the ride passengers 22, 24, 26, 28 while on the thrill ride 12. Moreover, by providing the stereoscopic AR/VR eyewear 34 as AR/VR eyeglasses, as opposed to bulkier and more cumbersome devices such as traditional head-mounted displays (HMDs), the ride passengers 22, 24, 26, 28 may be provided with greater freedom of movement, as well as a more photorealistic experience. For example, each of the ride passengers 22, 24, 26, 28 may be able to see each other ride passenger 22, 24, 26, 28, as well as the passenger ride vehicle 20 itself even when wearing the stereoscopic AR/VR eyewear 34. Moreover, because the stereoscopic AR/VR eyewear 34 may include individual cameras 40, 42 and individual displays 37, 38, data with respect to the respective points of view of each eye of the ride passengers 22, 24, 26, 28 may be captured by the stereoscopic AR/VR eyewear 34. Thus, the graphics generation system 32 may render real-world images 44 and AR/VR images 45 on the displays 37, 38 of the stereoscopic AR/VR eyewear 34 that are consistent with the respective points of view of the ride passengers 22, 24, 26, 28. Such advantages may be unavailable using devices such as traditional HMDs. In other embodiments, the system 32 may use audio watermarking to synchronize AR content within the ride 12, e.g., to synchronize played media to AR images.

Figure 5:
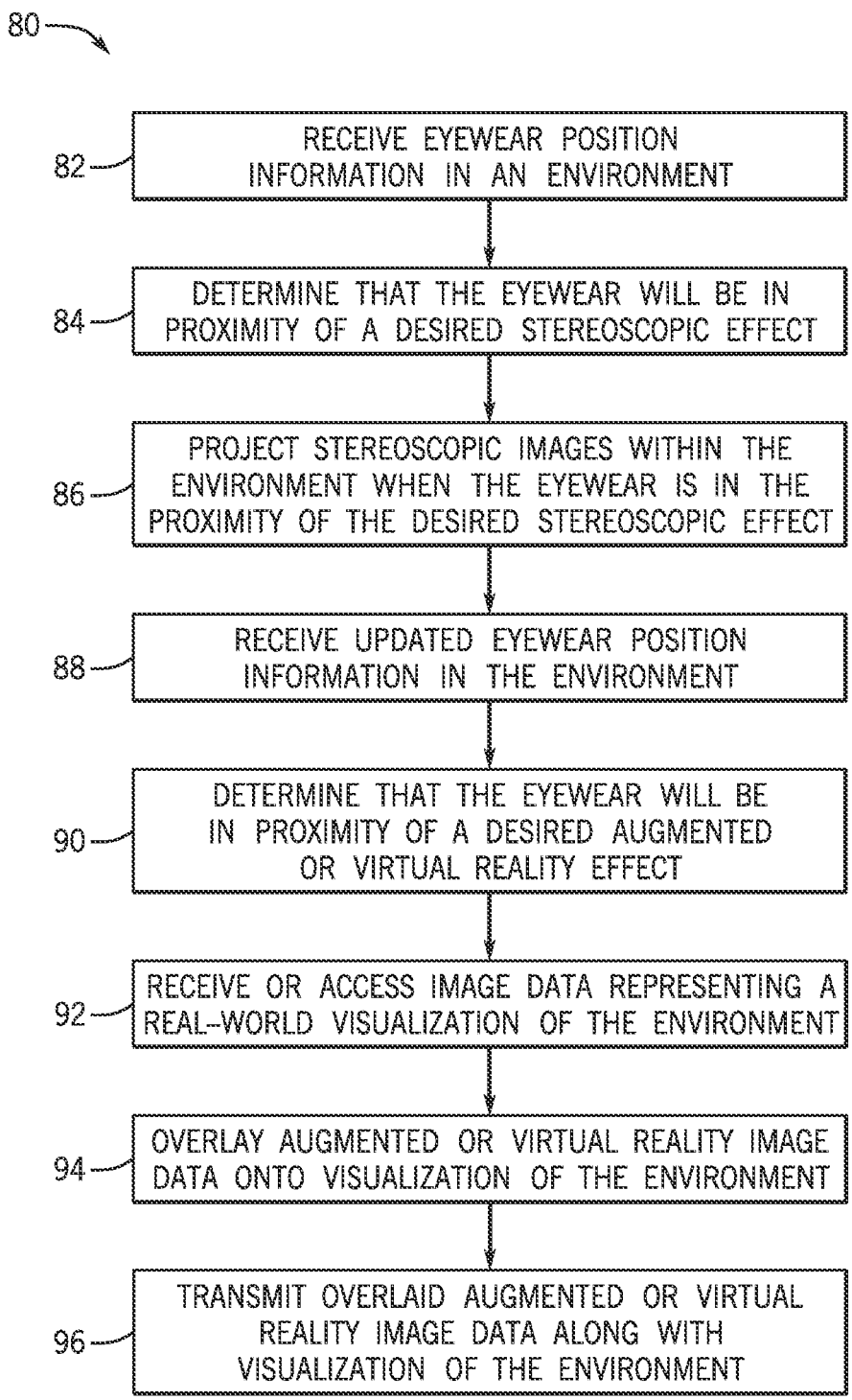
FIG. 5 is a flowchart illustrating an embodiment of a process useful in creating stereoscopic images within an AR experience, a VR experience, or a mixed reality experience during a ride by using the computer graphics generation system of FIG. 2, in accordance with present embodiments.

Turning now to FIG. 5, a flow diagram is presented, illustrating an embodiment of a process 80 useful in creating a stereoscopic experience, an AR experience, a VR experience, and/or other computed-mediated experience during a thrill ride using, for example, the computer graphics generation system 32 depicted in FIG. 2. The process 80 may be representative of initiated code or instructions stored in a non-transitory computer-readable medium (e.g., the memory 47) and executed, for example, by the processor 46 included in the computer graphics generation system 32. The process 64 may begin with the processor 46 receiving (block 82) position information for a user wearing the eyewear 34. As discussed, the eyewear position may be assessed by RFID tags on each device, by cameras, GPS, etc. Based on the position, the system 32 may determine that the user wearing the eyewear 34 is positioned in the proximity of a desired stereoscopic event (block 84). Accordingly, the system 32 may initiate or maintain projection of stereoscopic images for display and viewing by the user (block 86).

If the user of the eyewear 34 is a passenger on a ride vehicle (see FIG. 4) or otherwise moving relative to the environment, the method 80 may receive updated position information (block 88) to reflect that the user has moved to a new location associated with a desired mixed or AR/VR effect (block 90). To generate the AR/VR effect, the method may access pre-scanned or receive real-time captured image data (block 92). For example, the processor 46 may receive real-time video data (e.g., live video) captured via cameras 40, 42 of the stereoscopic AR/VR eyewear 34. The process 64 may then continue with the processor 46 generating a visualization of the real-world environment based on the real-world image data. For example, the processor 46 may generate a video data stream of the real-world environment (e.g., the amusement park 10) to be displayed on the displays 37, 38 of the stereoscopic AR/VR eyewear 34.

The process 64 may then continue with the processor 46 overlaying (block 92) or superimposing one or more augmented or virtual reality images onto the generated visualization of the real-world environment. For example, the processor 46 may generate a video data stream of the real-world images 44 (e.g., facilities 14, thrill ride 12), and overlay or superimpose the AR/VR images 45 (e.g., AR/VR images or virtual augmentations 49, 50, 52, 54, 56, and 58) onto the real-world images 44 using one or more video merging and/or optical merging techniques. As previously discussed above, in certain embodiments, for example, the processor 46 of the graphics generation system 32 may render the AR/VR graphical images 45 based on, for example, the position or location of the passenger ride vehicle 20 along the tracks 18 at any given time during a cycle of the thrill ride 12, a predetermined distance traveled by the passenger ride vehicle 20 during a cycle of the thrill ride 12, or after a predetermined lapse of time. In other embodiments, the graphics generation system 32 may perform one or more geometric or photometric recognition algorithms on the video or image data captured via the cameras 40, 42 to determine the points of location of the ride vehicle 20 and when to introduce the AR/VR graphical images 45. The process 64 may then conclude with the processor 46 transmitting (block 94) the overlaid augmented or virtual reality image data (e.g., AR/VR images 45) along with the real-world environment data (e.g., real-world images 44) to be displayed on the displays 37, 38 of the stereoscopic AR/VR eyewear 34 to enhance the thrill factor of the thrill ride 12, and, by extension, the experience of the ride passengers 22, 24, 26, 28 while on the thrill ride 12. The system 32 is configured to permit the eyewear 34 to switch between different viewing modes, e.g., AR/VR, stereoscopic, and real world (e.g., no effects). The switch may be based on the time or position of the user within the ride 12 and may be mediated by a control signal from the system 32. The system 32 may also receive user input, e.g., via an input button or switch on the eyewear. For example, certain users may be sensitive to stereoscopic image display. Such users may have the option of turning off the 3D stereoscopic viewing and the system 32 may provide alternative video data in the proximity of stereoscopic effects.

Technical effects of the present embodiments relate to systems and methods of providing an augmented reality (AR) experience, a virtual reality (VR) experience, a mixed reality (e.g., a combination of AR and VR) experience, or a combination thereof, as part of a thrill ride in an amusement park or theme park. In certain embodiments, each ride passenger may be provided with eyewear (e.g., stereoscopic AR/VR eyewear 34 that is configured to be used as AR/VR eyewear) to be worn during a cycle of the thrill ride. In on embodiment, the eyewear is both AR/VR capable as well as being capable of facilitating the viewing of projected stereoscopic images. To facilitate an AR/VR or mixed reality experience, the eyewear may be configured to display virtual images overlaid over a real-world representation. To that end, the eyewear may include at least two cameras, which may respectively correspond to the respective points of view of the ride passengers, and may be used to capture real-time video data (e.g., live video) of the real-world environment (e.g., the physical amusement park) of the ride passengers and/or the thrill ride. The eyewear may also include at least two displays respectively corresponding to each eye of the ride passengers. In certain embodiments, a computer graphics generation system may also be provided. The computer graphics generation system may render a video stream of the real-world environment along with various AR/VR graphical images to the respective displays of the respective stereoscopic eyewear of the ride passengers during a cycle of the thrill ride. For example, in one embodiment, the graphics generation system 32 may render the AR/VR graphical images to the eyewear based on, for example, the position or location of the passenger ride vehicle along the tracks at any given time during a cycle of the thrill ride, a predetermined distance traveled by the passenger ride vehicle during a cycle of the thrill ride, or after a predetermined lapse of time. In this way, by using the eyewear and the graphics generation system to create an AR experience, a VR experience, and/or mixed reality experience, the eyewear and the computer graphics generation system may enhance the thrill factor of the thrill ride, and, by extension, may enhance the experience of the ride passengers as they ride the thrill ride.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A method, comprising:
receiving, at a computer graphics generation system, position information for eyewear configured to be worn by a user, wherein the eyewear comprises:
a display configured to toggle between an opaque configuration and a transparent configuration, and
a stereoscopic feature configured to permit the user to resolve externally generated stereoscopically displayed images when in the transparent configuration and configured to permit viewing of streaming media when in the opaque configuration;
determining, via the computer graphics generation system, that the position information is associated with a stereoscopic projection;
activating, via first instructions provided to the eyewear, the transparent configuration based on the position information;
receiving, at the computer graphics generation system, updated position information for the eyewear;
determining, via the computer graphics generation system, that the updated position information is associated with virtual augmentations;
activating, via second instructions provided to the eyewear, the opaque configuration based on the updated position information;
generating, via the computer graphics generation system, streaming media of a real world environment based on image data of the real world environment;
generating, via the computer graphics generation system, one or more virtual augmentations configured to be superimposed on the streaming media of the real world environment; and
transmitting, via communication with the eyewear, the streaming media of the real world environment along with the one or more superimposed virtual augmentations to be displayed on the display of the eyewear in the opaque configuration.

2. The method of claim 1, comprising instructing, via the computer graphics generation system, a stereoscopic projector to project externally generated stereoscopic images in the real world environment to be viewed through the display having the stereoscopic feature.

3. The method of claim 1, wherein the display of the eyewear comprises a first display and a second display, and wherein the first display is configured to display to a first eye of the user and the second display is configured to display to a second eye of the user.

4. The method of claim 1, comprising generating the one or more virtual augmentations based on an orientation of the eyewear.

5. The method of claim 1, comprising generating, via the computer graphics generation system, the one or more virtual augmentations based on a position of the user and/or a point of view of the user.

6. The method of claim 1, comprising generating, via the computer graphics generation system, the one or more virtual augmentations based on profile information of the user.

7. The method of claim 1, comprising generating, via the computer graphics generation system, the one or more virtual augmentations based on a character associated with the user.

8. The method of claim 1, wherein the position information is received at the computer graphics generation system from a tracking sensor, and wherein the tracking sensor comprises an orientation sensor, a position sensor, an accelerometer, a magnetometer, a gyroscope, or any combination thereof.

9. The method of claim 1, comprising receiving, at the computer graphics generation system, an identification signal of the eyewear from a tag.

10. The method of claim 9, wherein the one or more virtual augmentations are generated based on the identification signal.

11. A method, comprising:
transmitting, to a computer graphics generation system, position information for eyewear configured to be worn by a user, wherein the eyewear comprises:
a display configured to toggle between an opaque configuration and a transparent configuration, and
a stereoscopic feature configured to permit the user to resolve externally generated stereoscopically displayed images when in the transparent configuration and configured to permit viewing of streaming media when in the opaque configuration;
receiving, from the computer graphics generation system, instructions to activate the transparent configuration based on the position information for the eyewear;
transmitting, to the computer graphics generation system, updated position information for the eyewear;
receiving, from the computer graphics generation system, instructions to activate the opaque configuration based on the updated position information for the eyewear; and
displaying, via the eyewear, streaming media of a real world environment based on image data of the real world environment along with one or more superimposed virtual augmentations on the display of the eyewear.

12. The method of claim 11, wherein the display, in the transparent configuration, permits viewing of externally generated stereoscopic images in the real world environment.

13. The method of claim 11, wherein the display comprises a first display and a second display, and wherein the first display is configured to display to a first eye of the user and the second display is configured to display to a second eye of the user.

14. The method of claim 13, wherein each of the first display and the second display comprises a light field display, a liquid crystal display (LCD), or an organic light emitting diode (OLED) display.

15. The method of claim 13, wherein the stereoscopic feature of the eyewear comprises a first polarized filter on or in the first display oriented differently than a second polarized filter on or in the second display and wherein the stereoscopically displayed images are resolved through the first polarized filter and second polarized filter.

16. The method of claim 13, wherein the stereoscopic feature of the eyewear comprises a first color filter on or in the first display configured to filter light of a different wavelength than a second color filter on or in the second display.

17. The method of claim 11, wherein the position information is indicative of an orientation of the eyewear.

18. The method of claim 11, wherein the position information is indicative of a position of the user and/or a point of view of the user.

19. The method of claim 11, wherein the position information is generated by a tracking sensor, and wherein the tracking sensor comprises an orientation sensor, a position sensor, an accelerometer, a magnetometer, a gyroscope, or any combination thereof.

20. The method of claim 11, comprising transmitting an identification signal of the eyewear from a tag.

\* \* \* \* \*